(12) United States Patent
Lethin

(10) Patent No.: US 12,408,653 B1
(45) Date of Patent: Sep. 9, 2025

(54) BIRD DIVERTER APPLICATOR THAT ATTACHES BIRD DIVERTERS TO POWER LINES

(71) Applicant: John Paul Lethin, Lihue, HI (US)

(72) Inventor: John Paul Lethin, Lihue, HI (US)

( * ) Notice: Subject to any disclaimer, the term of this patent is extended or adjusted under 35 U.S.C. 154(b) by 196 days.

(21) Appl. No.: 18/097,187

(22) Filed: Jan. 13, 2023

Related U.S. Application Data

(60) Provisional application No. 63/299,352, filed on Jan. 13, 2022.

(51) Int. Cl.
*A01M 29/06* (2011.01)
*B64U 101/28* (2023.01)
*B64U 101/60* (2023.01)

(52) U.S. Cl.
CPC ......... *A01M 29/06* (2013.01); *B64U 2101/28* (2023.01); *B64U 2101/60* (2023.01)

(58) Field of Classification Search
CPC ... A01M 29/06; A01M 29/00; B64U 2101/60; B64U 2101/28; B64U 2101/64; G05D 1/656; B64D 1/22
See application file for complete search history.

(56) References Cited

U.S. PATENT DOCUMENTS

| | | | | |
|---|---|---|---|---|
| 3,430,325 | A * | 3/1969 | Lematta | H02G 1/02 294/110.1 |
| 5,038,465 | A * | 8/1991 | Jans | H02G 1/04 29/818 |
| 9,688,404 | B1 * | 6/2017 | Buchmueller | G05D 1/00 |
| 10,099,561 | B1 * | 10/2018 | Ananthanarayanan | B60L 53/126 |
| 11,993,294 | B2 * | 5/2024 | Beckman | B64U 70/90 |
| 11,993,375 | B2 * | 5/2024 | Resnick | B64U 30/20 |
| 2013/0104798 | A1 * | 5/2013 | Spencer | A01M 29/10 116/22 A |
| 2019/0141982 | A1 * | 5/2019 | Carnell | A01M 29/30 119/713 |
| 2019/0176984 | A1 * | 6/2019 | Wabnegger | H05K 9/0007 |
| 2020/0148360 | A1 * | 5/2020 | Zhang | B64D 1/22 |
| 2021/0013705 | A1 * | 1/2021 | Miron | H02G 1/02 |
| 2021/0114729 | A1 * | 4/2021 | Ragan | B64D 9/00 |
| 2022/0156681 | A1 * | 5/2022 | Hill | G06Q 10/083 |
| 2022/0198944 | A1 * | 6/2022 | McLemore | G08G 5/0013 |
| 2022/0244127 | A1 * | 8/2022 | Aubrey | B64U 10/13 |
| 2023/0331386 | A1 * | 10/2023 | Parraga | B64D 1/12 |
| 2024/0140629 | A1 * | 5/2024 | Boomgaard | H01M 50/249 |

* cited by examiner

*Primary Examiner* — Gisele D Ford
(74) *Attorney, Agent, or Firm* — Plager Schack LLP; Mark H. Plager; Stephen Hallberg

(57) ABSTRACT

A bird diverter applicator for drones is disclosed. The bird diverter applicator for drones reduces the risk of electrocution to ground crews and eliminates the need to de-energize the power lines for installation of the bird diverters.

9 Claims, 6 Drawing Sheets

BIRD DIVERTER APPLICATOR THAT ATTACHES BIRD DIVERTERS TO POWER LINES

This application claims benefit to U.S. Provisional Patent Application 63/299,352, entitled "A BIRD DIVERTER APPLICATOR THAT IS CONFIGURED FOR INSTALLATION ON POWER LINES BY DRONES," filed Jan. 13, 2022. The U.S. Provisional Patent Application 63/299,352 is incorporated herein by reference.

BACKGROUND

Embodiments of the invention described in this specification relate generally to bird diverters, and more particularly, to a bird diverter applicator that is designed to mount atop an aerial drone while holding a bird diverter during flight and releasing the bird diverter to attach to the power line.

Environmentalists and biologists have determined that avian power line strikes occur in vast numbers on a consistent basis. As such, many varieties of threatened and endangered avians (birds) inadvertently strike power lines. One reason is because the power lines are not easily visible in low light conditions. In fact, there has been overwhelming evidence that tens of thousands of threatened and/or endangered avian species inadvertently strike utility transmission and distribution power lines. Bird diverters have been created to minimize the number of avian power line strikes. Bird diverters are typically made up to of reflective material that make the markers and line visible to avians in flight. However, a common bird diverter product flaw is not having a device that holds the bird diverter jaws in an open position with just enough tension to deploy the spring tensioned jaws when the device comes in contact with the power line.

Traditionally, these bird diverters are installed by the utility companies line crews. Installation of bird diverters on power lines is challenging, demanding, and risky. Crew men typically install these bird diverters manually using a utility bucket truck. The lines also have to be de-energized for crew safety, thus resulting in a disruption of the electrical power grid. Also, the risk of electrocution to ground crews or injury by falling to bucket truck personnel is high. If power lines can be de-energized, it helps mitigate some (but not all) of the risk. Yet, the work is physically demanding and challenging. So, even when risks are reduced, the challenges of installation remain and the work is demanding no matter how much the risk is mitigated.

Therefore, what is needed is different way to install bird diverters on power lines that reduces risks to human workers while maintaining power of the electrical lines to the power grid.

BRIEF DESCRIPTION

A novel bird diverter applicator for drones is disclosed which minimizes avian power line strikes. In some embodiments, the bird diverter applicator can be retrofit to a SUAS drone platform facilitating bird diverter installation. In some embodiments, the bird diverter applicator works with any current bird diverters that use a marker card and jaw clamp mechanism. In some embodiments, the bird diverter applicator includes a biodegradable retention device which holds the bird diverter jaws open to a suitable position, allowing jaw deployment to occur with contact with power line. In some embodiments, the bird diverter applicator is configured for installation on power lines by drones. In some embodiments, the utilization of drones allows bird diverters to be installed on power lines that maintain power on the power grid without requiring line crews and bucket trucks for installation. As a result, the bird diverter applicator for drones of the present disclosure reduces risks to human workers, such as by electrocution or by falling, and eliminates the need to de-energize power lines.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
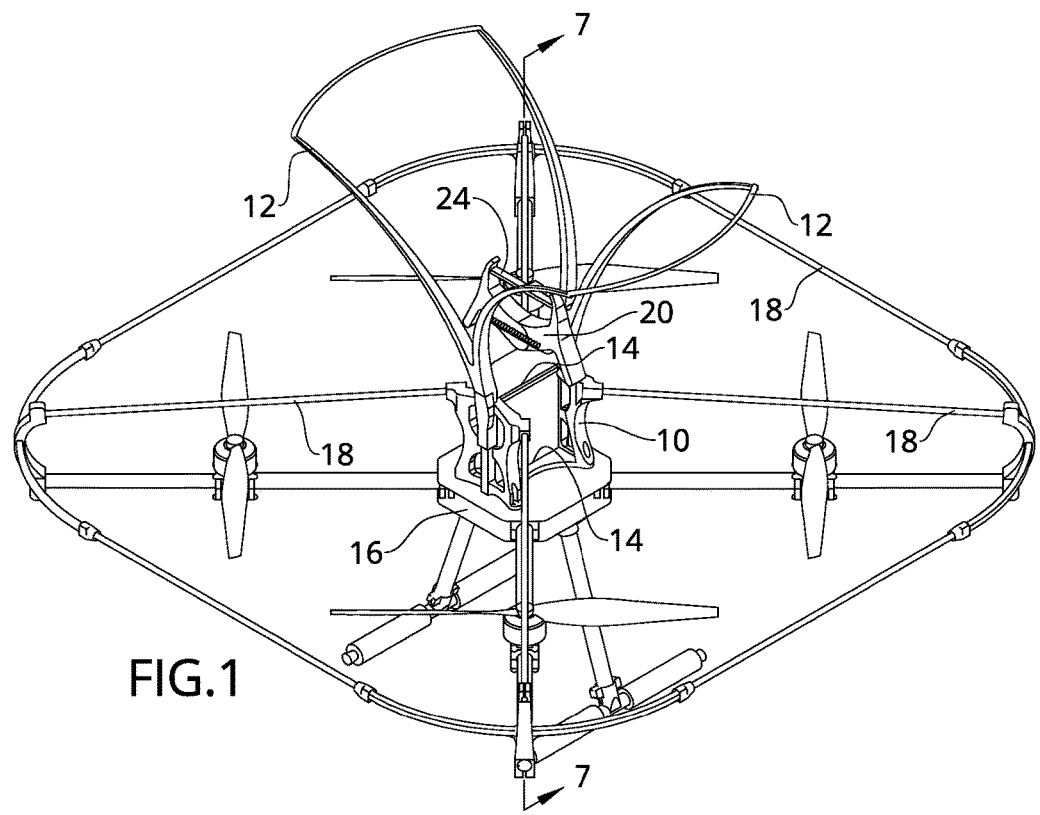
FIG. 1 conceptually illustrates a perspective view of a bird diverter applicator on an aerial drone in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments provide a bird diverter applicator configured to retrofit to a SUAS drone platform. In some embodiments, the bird diverter applicator is configured for installation on power lines by drones. In particular, a drone pilot can apply bird diverters using a SUAS drone. In some embodiments, the utilization of drones, such as the SUAS drone, allows bird diverters to be installed on power lines while maintaining power on the power grid and without requiring line crews and bucket trucks for installation. Thus, the bird diverter applicator for drones of the present disclosure reduces risks to human workers (personnel), such as by electrocution or by falling, and eliminates the need to de-energize power lines.

As stated above, installation of bird diverters on power lines is challenging, demanding, and risky. Typically, line crews and bucket trucks are utilized to install bird diverters on power lines. However, the risk of electrocution to ground crews or injury by falling to bucket truck personnel is high. If power lines can be de-energized, it helps mitigate some (but not all) of the risk. Yet, the work is physically demanding and challenging. So, even when risks are reduced, the challenges of installation remain and the work is demanding no matter how much the risk is mitigated. Embodiments of the bird diverter applicator that is configured for installation on power lines by drones described in this specification solve such problems by an applicator that allows bird diverters to be installed by drones, which reduces manpower costs and mitigates risk to human works, while not even requiring the power lines to be de-energized by the utility provider.

Embodiments of the bird diverter applicator for drones described in this specification differ from and improve upon currently existing options. In particular, some embodiments differ from currently existing installation mechanisms and methods. For instance, existing method involve human workers to handle and install bird diverters on the power lines. Specifically, bird diverters are installed by linemen who use hot sticks, and who need to de-energize the power lines and physically attach bird diverters via a bucket truck or other mechanism. The ground crew holds lines in place with hot sticks while this is happening, adding to the potential risk. This is a costly and dangerous way to install bird diverters. By contrast, the bird diverter applicator for drones of the present disclosure reduces the risk of electrocution to ground crews and eliminates the need to de-energize the power lines for installation. In other words, the bird diverter applicator for drones described in this specification allows for installation on energized lines which keeps the electrical grid in tact. Furthermore, the bird direver applicator possesses an integrated SUAS drone cage, which can be engineered to fit any drone platform. Using the integrated bird diverter applicator cage markedly reduces the risk of SUAS drone propellers striking the power line, thereby minimizing the risk of the SUAS drone crashing.

The bird diverter applicator for drones of the present disclosure may be comprised of the following elements. This list of possible constituent elements is intended to be exemplary only and it is not intended that this list be used to limit the bird diverter applicator for drones of the present application to just these elements. Persons having ordinary skill in the art relevant to the present disclosure may understand there to be equivalent elements that may be substituted within the present disclosure without changing the essential function or operation of the bird diverter applicator for drones.

1. Bird diverter drone mount applicator and marker card to hold the bird diverter on top of the drone. The drone is then flown under the power line that requires the bird diverter. The bird diverter is then attached to the power and/or distribution line.

2. Bird diverter biodegradable retention device that holds the "jaws" of the bird diverter open, until pressure is applied from upward thrust of the drone in contact with the power line. The retention device is scored to break under one foot pound of pressure deploying the bird diverter jaws, leaving the bird diverter attached to the power and/or distribution line.

3. Integrated drone cage system that includes a SUAS drone cage integrated into the bird diverter applicator, which shields the drone and propellers from striking the power and/or distribution line(s).

The various elements of the bird diverter applicator for drones of the present disclosure may be related in the following exemplary fashion. It is not intended to limit the scope or nature of the relationships between the various elements and the following examples are presented as illustrative examples only. The bird diverter applicator holds the bird diverter marker card securely in place on top of the drone and in a fixed position as top guides allow the drone pilot to position the drone (SUAS drone) to the power line for bird diverter installation. The retention device holds the jaws of the bird diverter open, allowing the jaws to release and clamp on the power line when upward pressure is applied by the drone. The integrated cage system protects the drone and drone propellers from striking the power line, which might otherwise result in a crash.

The bird diverter applicator for drones of the present disclosure generally works by in a way that allows bird diverters to be safely applied to power lines for utility providers. Specifically, the bird diverter applicator for drones is a product that allows these bird diverters to be installed via aerial drone (SUAS drone) without the need of any human being in close proximity to the power line. The power lines can also remain energized during the installation process, thus not interrupting the power grid. Also, the bird diverter applicator and integrated SUAS drone cage system is installed on the drone platform. This applicator and cage system can be designed to fit on any multi rotor drone platform that is capable of carrying a 700 gram bird diverter payload. In some embodiments, the jaws are manually opened to a diameter of approximately 3.25" and the biodegradable jaw retention device is inserted into the bird diverter jaw opening, thereby creating an open position which is still under spring tension. The bird diverter is then installed into the bird diverter applicator card slot. The SUAS drone is flown by the drone pilot to the power line, utilizing the bird diverter applicator guides which allow precise placement to the power line. When approximately one foot pound of pressure is sensed between the line and the bird diverter biodegradable jaw retention device, the bird diverter is safely installed on the power line.

To make the bird diverter applicator for drones of the present disclosure, it is possible to make with 3D printed high density/low weight PLA materials and carbon fiber. The materials are created in custom and very specific dimensions which are tailored to the drone platform which will be deploying the bird diverters. Applicator bird diverter holder is configured to securely hold the bird diverter in place during drone flight. The retention device hold the bird diverter jaws in an open position and allows the jaws to deploy closed, locking the diverter onto the power line when one foot pound of pressure is applied by the power line in association of upward thrust from the drone. The integrated cage system eliminates the risk of drone propellers from striking the power line, reducing the risk of drone crash. The cage system can be used alone for flying a drone in close proximity to power lines or objects that might strike the drone propellers. Also, depending on the SUAS drone platform utilized for bird diverter installation, and the type of bird diverter to be installed, the bird diverter applicator and integrated cage system is sized to fit the SUAS drone platform and the bird diverter applicator is sized to allow the bird diverter card to be safely carried and deployed. The biodegradable jaw retention device is also sized to fit the corresponding model/type of bird diverter clamping mechanism.

To use the bird diverter applicator for drones of the present disclosure, a person would safely install the bird diverter by a Part 107 drone operator from the ground. Power lines can remain energized during the bird diverter application process. Furthermore, the bird diverter applicator for drones can be adapted for installation of other items on power lines or any other line that is suspended and not easily accessed from the ground.

Figure 2:
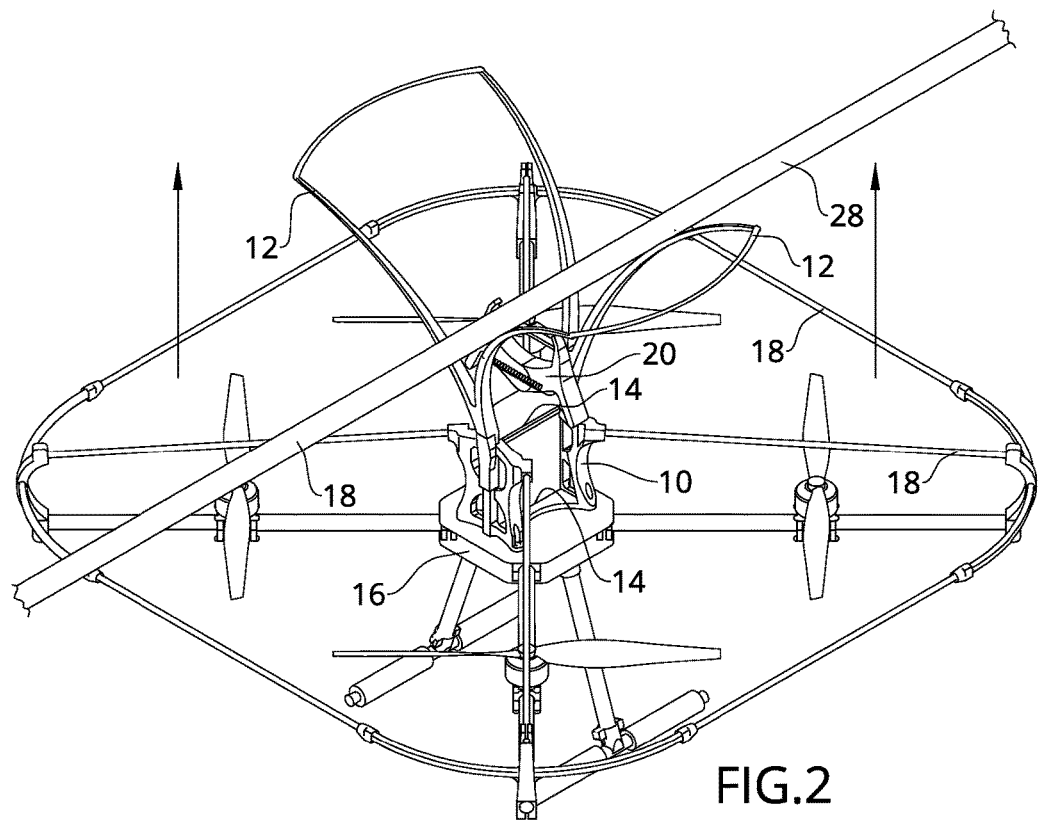
FIG. 2 conceptually illustrates a perspective view of the bird diverter applicator as the aerial drone approaches a power line in some embodiments.
Figure 3:
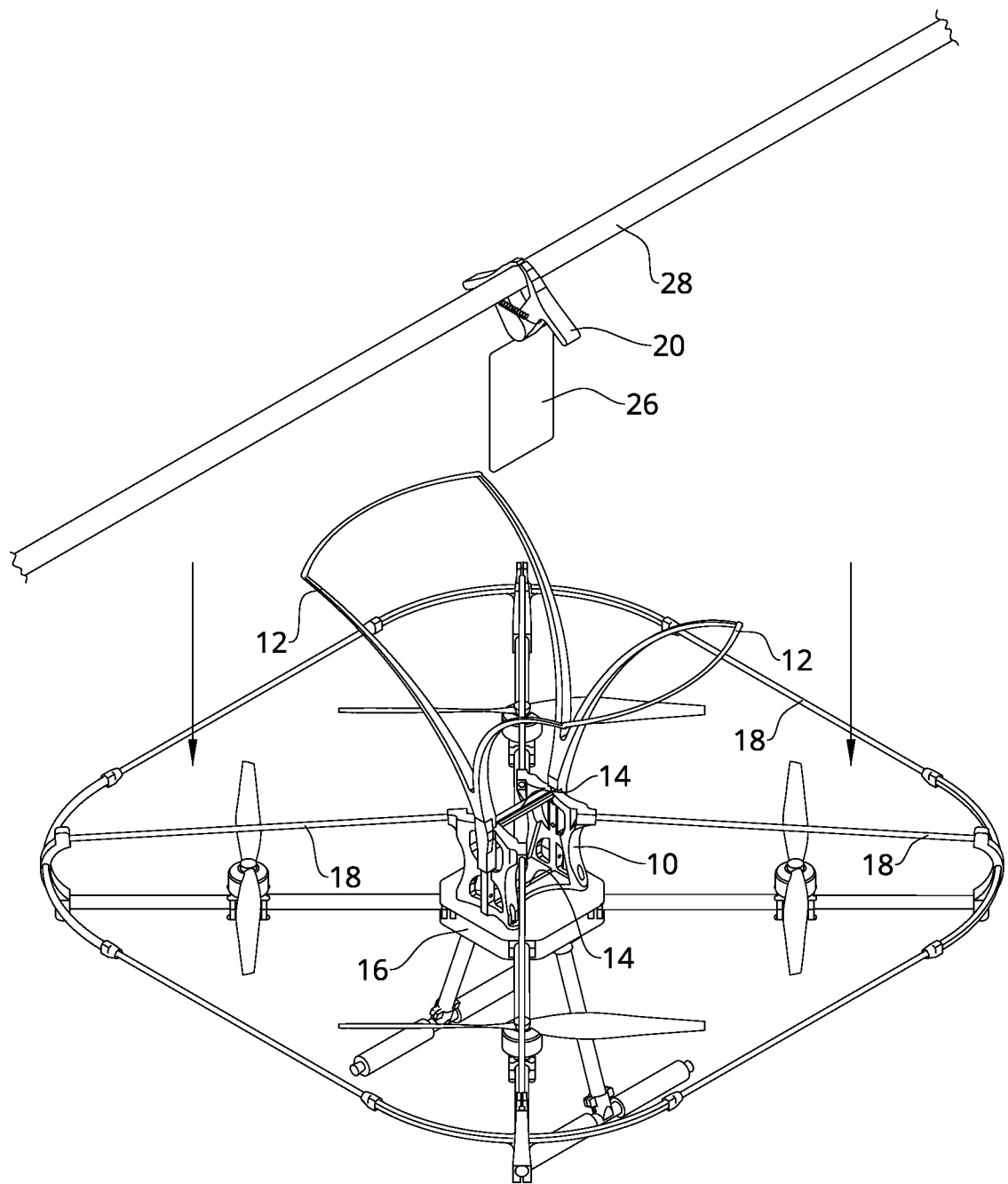
FIG. 3 conceptually illustrates a perspective view of the aerial drone leaving the power line after a bird diverter apparatus (hereinafter also referred to as the "bird diverter", the "bird flapper", the "bird reflector", or "bird flight diverter") is installed on the power line by the bird diverter applicator in some embodiments.

By way of example, FIGS. 1-3 conceptually illustrates perspective views of a bird diverter applicator on an aerial drone as the aerial drone approaches a power line, attaches a bird diverter to the power line, and leaves the power line in some embodiments. Specifically, a bird diverter applicator shown in these figures a holder 10, guide wings 12, and diverter slots 14. The bird diverter applicator is mounted on an aerial drone 16. A bird diverter 20 is inserted into the diverter slots 14, such that the bird diverter applicator can securely hold the bird diverter 20 in place as the aerial drone 16 flies toward a power line 28 to which the bird diverter 20 is intended to attach. The bird diverter 20 has break bars 24 which are configured to break when upward pressure (from the drone 16) is applied against the power line 28. When the break bars 24 break, the bird diverter 20 is configured to snap shut, thereby attaching the bird diverter 20 to the power line 28. Also, protective lines 18 (also referred to as the "protective cage 18") surround the bird diverter applicator and protect the aerial drone 16 from the power line 28. After the bird diverter 20 is attached to the power line 28, the aerial drone 16 flies down and away from the power line 28 and bird diverter 20. Also, a bird diverter flag 26 is shown visibly hanging from the bird diverter 20 after attachment to the power line 28. In this way, birds can change their flight path to avoid the visible flag 26 and thereby avoid collision with the power line 28.

Figure 4:
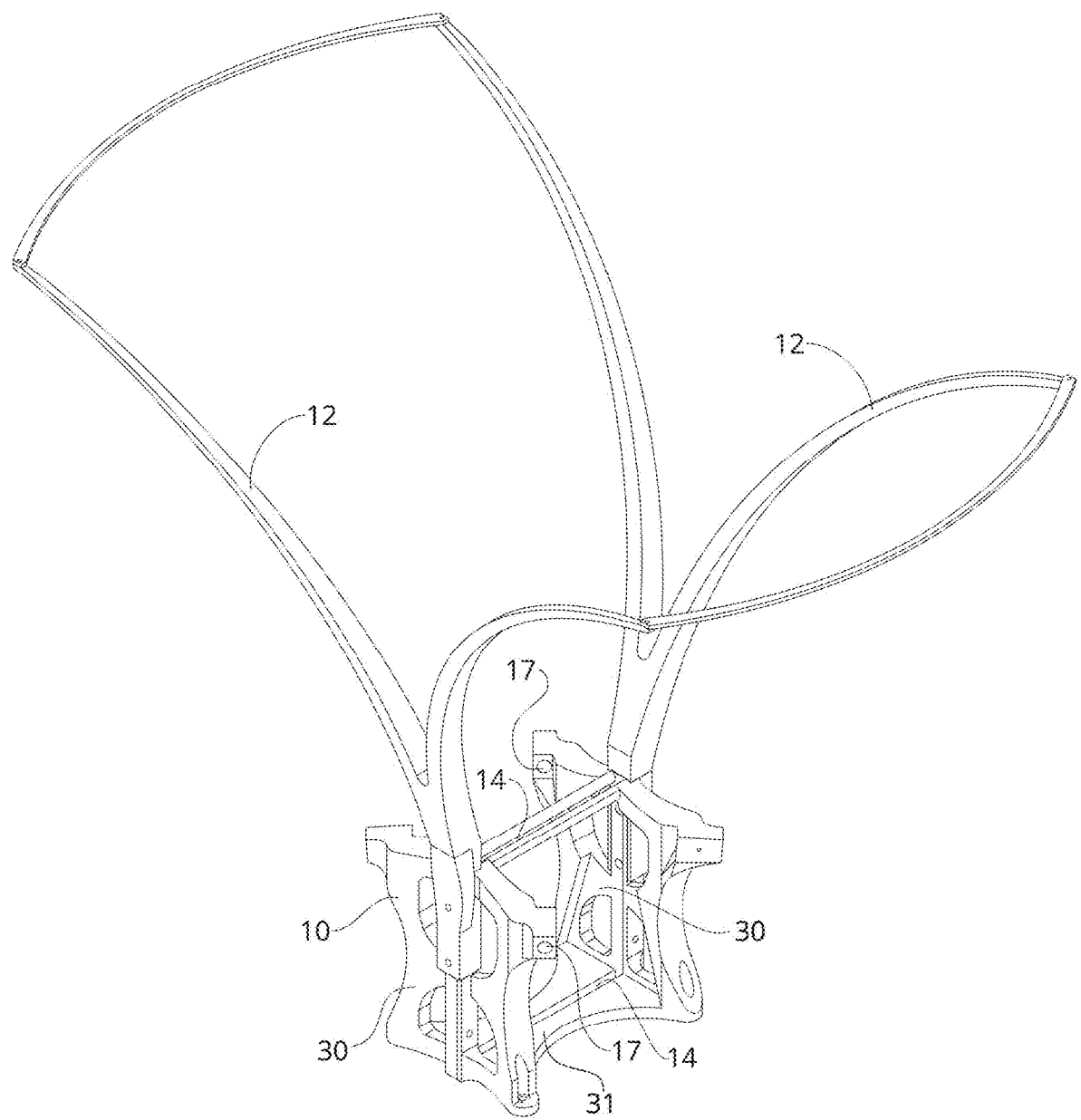
FIG. 4 conceptually illustrates a perspective view of a bird diverter applicator in some embodiments.

By way of another example, FIG. 4 conceptually illustrates a perspective view of a bird diverter applicator in some embodiments. As shown in this figure, the bird diverter applicator comprises the holder 10 with two holder sides 30 and a base 31, two guide wings 12, the diverter slots 14, and protective line slots 17. The diverter slots 14 are connected to the holder 10 between the two holder sides 30 and are configured to hold the flag 26 of the bird diverter 20 securely in place as the aerial drone 16 approaches the power line 28. The guide wings 12 provide a channeling effect against the power line 28 to ensure that the upward movement of the aerial drone 16 positions the bird diverter 20 in direct alignment to connect to the power line 28. When the upward pressure is sufficient, the break bars 24 of the bird diverter 20 break, freeing the bird diverter 20 to snap shut (by a spring loaded mechanism) over the power line 28. Further details of the spring loaded mechanism of the bird diverter 20 are described below, by reference to FIG. 6.

Figure 5:
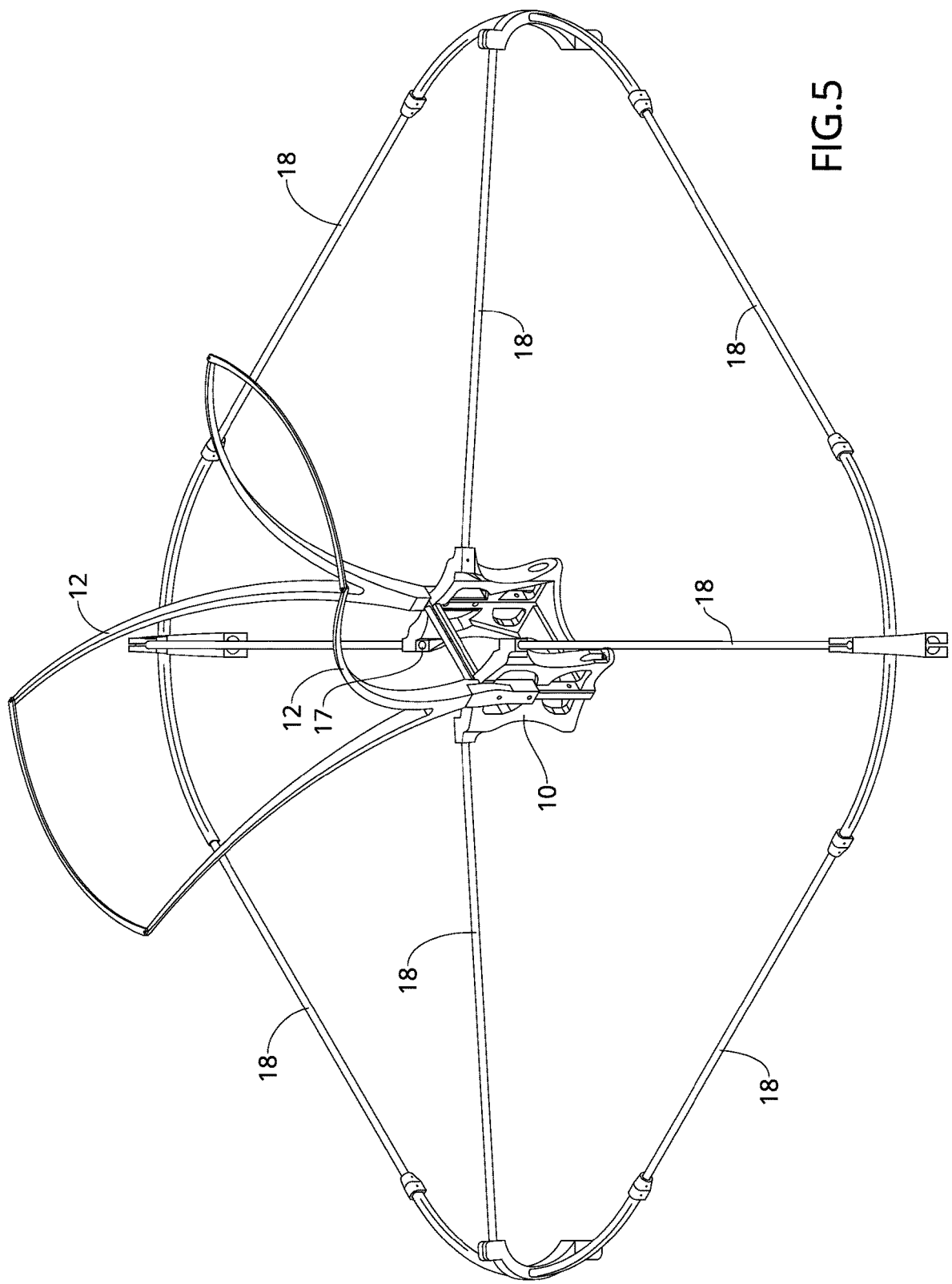
FIG. 5 conceptually illustrates a perspective view of the bird diverter applicator with a protective cage in some embodiments.

In another view, FIG. 5 conceptually illustrates a perspective view of the bird diverter applicator with the protective lines 18 demonstrated. Specifically, the protective lines 18 ensure that the blades of the aerial drone 16 and the aerial drone 16 itself do not collide with the power line 28 when the bird diverter applicator is attaching the bird diverter 20 to the power line 28.

Figure 6:
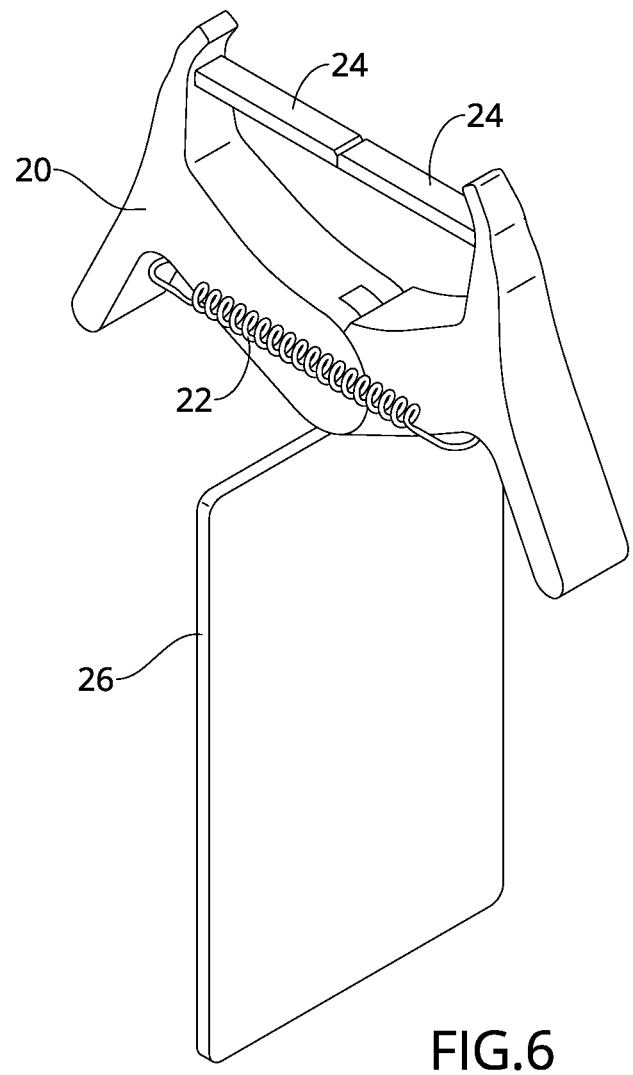
FIG. 6 conceptually illustrates a perspective view of an exemplary bird diverter which the bird diverter applicator is configured to hold while the aerial drone is approaching a power line and release when the bird diverter attaches to the power line.

Now referring to FIG. 6, a perspective view of the bird diverter 20 is shown with the bird diverter flag 26 attached to a bottom side of the bird diverter 20, break bars 24 near a top side of the bird diverter 20, and a spring 22 attached to the bird diverter 20 to provide spring loaded snapping action for the bird diverter 20 when the break bars 24 are broken (such as by upward pressure against the power line 28).

Figure 7:
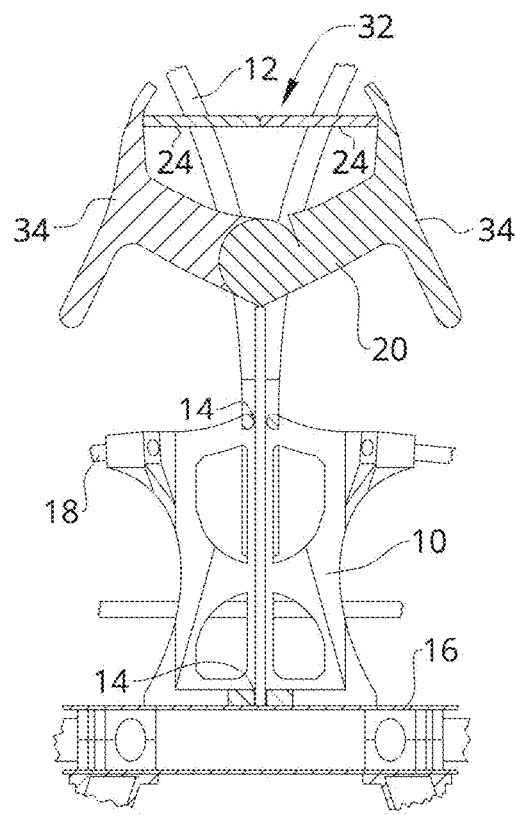
FIG. 7 conceptually illustrates a detailed section view of the bird diverter applicator holding the bird diverter and mounted on the aerial drone, taken along line 7-7 in FIG. 1.

In a different view, FIG. 7 conceptually illustrates a detailed section view of the bird diverter applicator holding the bird diverter 20 while the bird diverter applicator is mounted on the aerial drone 16, taken along line 7-7 in FIG. 1. Specifically, this view show the holder 10, the guide wings 12, the diverter slots 14, a top surface of the aerial drone 16, the protective lines 18, and the bird diverter 20. A retention device 32 comprising break bars 24 holds bird diverter jaws 34 of the bird diverter 20 open until the retention device 32 is broken between the break bars 24 and the jaws 34 clamp together.

Figure 8:
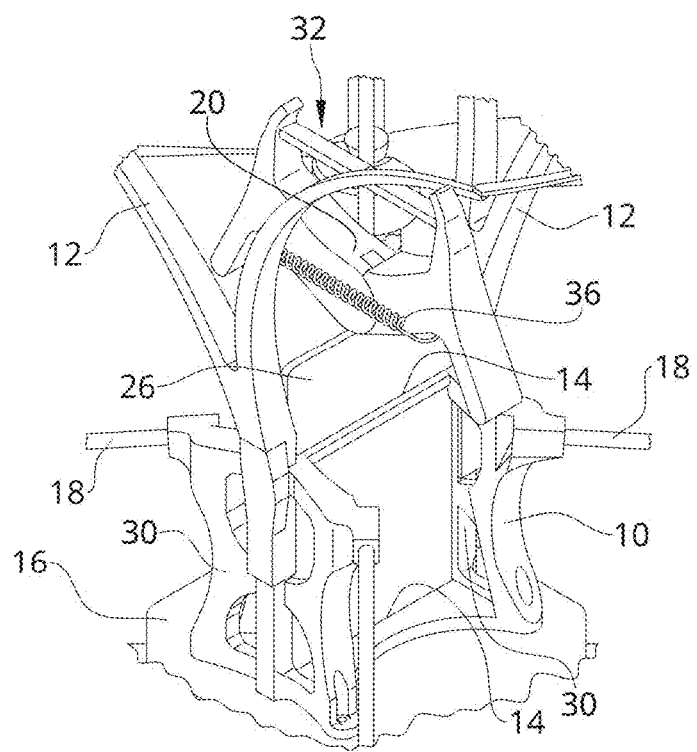
FIG. 8 conceptually illustrates a perspective view of the bird diverter applicator holding the bird diverter and mounted on the aerial drone in some embodiments.

By way of another example, FIG. 8 conceptually illustrates a perspective view of the bird diverter applicator holding the bird diverter 20 while mounted on the top surface of the aerial drone 16, and showing the holder 10 directly mounted to the top surface of the aerial drone 16, the guide wings 12 connected to the holder 10, the diverter slots 14 that are designed to hold the bird diverter flag 26 between different sides 30 of the holder 10, the protective lines 18 connected to the holder 10 and spanning outward, and the bird diverter 20 with spring 36 and break bars of the retention device 32 shown in this perspective view.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A bird diverter applicator for drones to attach bird diverters to power lines, said bird diverter applicator comprising:
    a holder comprising two holder sides and a holder base, wherein the holder is mounted to a top surface of an aerial drone;
    a pair of diverter slots connected to the holder between the two holder sides and configured to secure a bird diverter flag of a bird diverter between the two holder sides of the holder, wherein the bird diverter comprises a retention device and a spring, wherein the retention device comprises break bars that insert into an opening between bird diverter jaws of the bird diverter and are configured to hold open the bird diverter jaws of the bird diverter until upward thrust of the aerial drone in contact with a power line provides pressure sufficient to break the break bars, wherein the spring is under spring tension when the bird diverter jaws of the bird diverter are open and the break bars restrain closing of the bird diverter jaws, wherein the spring tension is released when the break bars break under pressure and the spring closes the jaw opening clamping the bird diverter jaws together; and a pair of guide wings that connect to the holder and are configured to align the bird diverter with the power line to which the bird diverter attaches during upward flight of the aerial drone.

2. The bird diverter applicator of claim 1, wherein the pair of diverter slots are connected to the holder by attachment to different sides of the holder.

3. The bird diverter applicator of claim 2, wherein the pair of diverter slots are configured to securely hold the bird diverter flag in an upright orientation with the bird diverter connected above the bird diverter flag.

4. The bird diverter applicator of claim 1 further comprising protective lines that attach to the holder and protect the aerial drone from the power line.

5. The bird diverter applicator of claim 4, wherein the protective lines form a protective cage for the aerial drone.

6. The bird diverter applicator of claim 1, wherein the break bars of the retention device are aligned together end-to-end to hold open the bird diverter jaws until upward thrust of the aerial drone in contact with the power line provides pressure sufficient to break the alignment of the break bars.

7. The bird diverter applicator of claim 6, wherein the retention device is scored to break under one foot pound of pressure.

8. The bird diverter applicator of claim 7, wherein the bird diverter attaches to the power line when the retention device breaks and the spring releases tension to clamp the bird diverter jaws of the bird diverter together.

9. The bird diverter applicator of claim 8, wherein the bird diverter flag maintains connection to the bird diverter attached to the power line as the aerial drone flies down and away from the power line and bird diverter.

* * * * *